May 19, 1953 G. S. SCHWARTZ 2,638,697
ILLUMINABLE ARTIFICIAL BAIT AND HOLDER THEREFOR
Filed Aug. 1, 1950
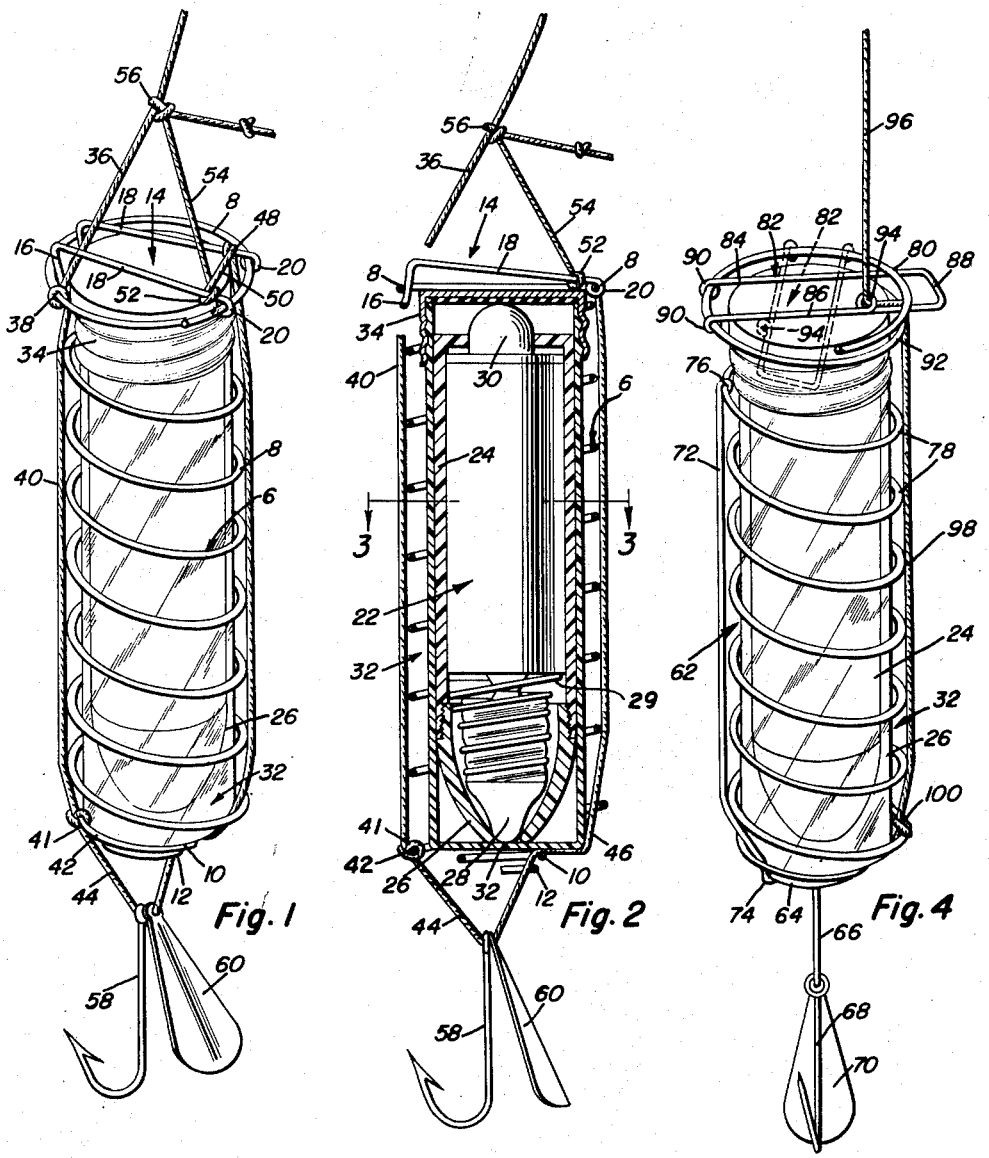
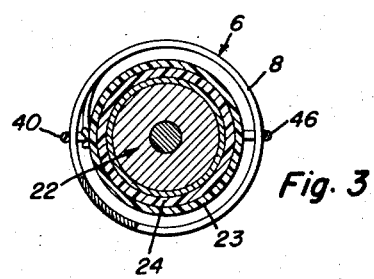
*Inventor*
George Simpson Schwartz
By *Clarence A. O'Brien and Harvey B. Jackson*
*Attorneys*

Patented May 19, 1953

2,638,697

UNITED STATES PATENT OFFICE 2,638,697

ILLUMINABLE ARTIFICIAL BAIT AND HOLDER THEREFOR

George Simpson Schwartz, Brownwood, Tex.

Application August 1, 1950, Serial No. 177,045

3 Claims. (Cl. 43—17.6)

The present invention relates to certain new and useful improvements in artificial fish bait and holding means therefor wherein the latter is characterized by a source of illumination constituting a source of attraction and greatly enhancing the luring properties of said bait.

It is a matter of common knowledge that many and varied styles and forms of illuminable devices have been used in connection with fishing tackle. For the most part when one thinks of so-called luminous artificial bait in the mechanical field, he naturally thinks of a small flashlight since it is common practice in this line of endeavor to employ flashlights in innumerable ways. Some provide a steady light source and other utilize intermittent light flashes with special circuit make and break controls. It is an object of the instant invention to provide a flashlight, to place the latter in a transparent liquid-proof casing and to enclose the two, the flashlight and cover or metal casing in an openwork cage.

Another object of the invention is to employ a simple and practical cage which takes the form of a coiled spring and which lends itself to the use of a line which is laced on the cage and thus is harnessed thereto in a manner to conveniently support a fish hook and a complemental spoon.

In carrying out the invention, a cage of complemental spoon.

In carrying out the invention, a cage of comparatively simple construction is provided and this is preferably in the form of a coiled spring with the convolutions made small at one end to provide a closed distal end, the opposite or proximal end being open and provided with a hingedly mounted catch which partially lids over said open end, is releasably fastened in place and serves to hold the illuminable insert in place.

Other objects and advantages will become more readily apparent from the following description and the accompanying illustrative drawings.

In the accompanying sheet of drawings wherein like numerals are employed to designate like parts throughout the views:

Fig. 1 is a perspective view of an illuminable-type artificial bait and holder constructed in accordance with the principles of the present invention;

Fig. 2 is a longitudinal view with parts in section and elevation showing all of the specific details of construction; and, Fig. 3 is a cross section taken on the plane of the line 3—3 of Fig. 2, looking in the direction of the arrows.

Fig. 4 is a perspective view corresponding, generally depicted, with Fig. 1 but showing a modified construction characterized principally by an improved catch construction.

The openwork protector cage is denoted by the numeral 6 and is preferably in the nature of a coiled spring the main or larger convolutions of which are denoted by the numerals 8. The smaller convolutions 10 and 12 as best shown in Fig. 2 constitute the bottom of the cage. That is to say, they are sufficiently small to close in the cage bottom. The cage is open at the top except for closing means provided by the readily attachable and detachable partial lidding catch 14. The catch is U-shaped and formed from a single piece of wire which is laterally bent between its ends to form a suitable detent 16 which latter is releasably engageable with the upper-most convolution in the manner shown in Fig. 2. The spaced parallel arms 18 span the open top and terminate in eyes 20 which are slidably hinged to the upper-most convolution and are pointed diametrically opposite to the detent 16. This cage constitutes an ideal holder and carrier for the illuminable insert. The insert is characterized by a flashlight of a miniature type and the flashlight embodies a dry cell or battery 22 mounted in an appropriate jacket 24. The latter is provided with a detachable lens 26 of any appropriate construction which houses a flashlight bulb 28 having an assembling and retaining spring 29. The "off" and "on" push button is denoted by the numeral 30. The complete flashlight is placed removably in a transparent shell or casing 32, the latter having a screw cap 34 which not only permits access to be had to the flashlight but also serves as the ways and means of turning the flashlight off and on. That is to say, by screwing the cap down tight the button 30 is depressed bringing the battery into contact with the bulb against the action of the spring and the light is turned "on." Unscrewing the cap turns the light "off."

This encased flashlight constituting the stated insert is put into the cage by way of the open end and then the catch 14 is closed down to assemble the two units; namely, the insert and cage.

The fishing line, which may be a regular cord or equivalent line, or perhaps a gut leader, is actually tied in place and thus harnessed on the cage. It is best to follow the line in the manner shown in Fig. 1 wherein the line proper is denoted at 36. It is tied in place on the uppermost convolution as denoted at 38 and then extends the full length of the cage as at 40. It is then half-hitched at 41 to the convolution 42 and is laced upwardly through the convolutions 10 and 12 as shown in Fig. 2. At this point the line is loosely arranged so as to form a sort of a saddle 44. The free end portion of the line is then directed upwardly from the point 46 where it ranges along the exterior of the cage at a point diametrically opposite the portion 40. Now the line is again twisted or half-hitched at 48 to one of the arms of the catch, is passed between the arms at 50 and is again hitched to the mating arm at 52. The terminal end portion of the line, the portion 54, is tied into a knot and connected with the line proper 36 as at 56. It will be seen therefore that the line is harnessed on the cage by lacing it to the cage parts in the manner shown. The loop or saddle 44 may be employed to accommodate a fishing hook 58 and a spoon 60.

Novelty is predicated on the insertable and removable flashlight means on the one hand and said means in conjunction with the cage if the cage per se be novel and the manner of lacing and fastening the flexible line to the cage for securely attaching the cage to the line. Also, utilizing the line as a support for the fishhook and spoon is novel.

Reference is had now to the modification disclosed in Figure 4. In this construction the openwork wire cage is also of coiled construction and denoted by the numeral 62. The bottom convolutions are made smaller to form a closed bottom as indicated at 64. Any suitable means 66 is here provided to suspend the fishhook 68 and the spoon 70. There is a rigid stay wire 72 provided and this has an eye 74 in its lower end which is connected with the lowermost convolution 64. There is a similar eye 76 at the top which is connected with one of the uppermost full convolutions 78. The uppermost convolution in this arrangement is denoted at 80 and is identified as a half-convolution. This functions as a keeper for the catch or latch 82. The latch in this construction is of general U-shaped form and the same includes limbs 84 and 86 and a connecting bight portion 88. The limbs at their free ends are provided with eyes 90—90 which are both slidably and hingedly connected to the convolution 92. The limb 86 is provided intermediate its ends with a line eye 94 to permit passage of portion 96 of the fishing line 98 which line is anchored by tying or otherwise at 100.

The catch 82 may be shifted from full line position here shown to the dotted line position. When it is in the dotted line position it is "open" and permits free access to be had to the interior of the cage. When it is in the full line closed position it overlies the otherwise open end of the cage and serves to hold the flashlight assembly in the cage. Incidentally, the flashlight assembly here shown is the same as that already shown and described and consequently the same numerals as previously employed are employed in this figure whereby like parts are denoted by like numerals throughout all the views. In this modification the stay 72 stabilizes the convolutions forming the openwork cage. The fishing line is simplified and merely anchored at one point on the lower end portion of the cage and then drawn upwardly alongside of the cage and passed through the eye 94 in the catch 82. The catch 82 is novel in that the bight portion, which constitutes the keeper, is interposed between the half convolution 80 and the full convolution 92 in order to retain the latch in closed position. By catching hold of the bight portion and shoving the entire catch around through a part circular path it "rides" on the convolution 92, by way of eyes 90—90, to the open dotted line position here shown.

Novelty is thought to reside in the generic and the specific phases of the overall construction and the claims are so presented.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. In an illuminable artificial bait of the class shown and described, an openwork wire cage adapted to serve as a holder for an insertable and removable illuminable insert and embodying convolutions and substantially closed at one end and completely open at the opposite end, the last named end including a resilient free-ended half-convolution and an underlying full convolution, said half-convolution and full convolution providing keeper means, and a U-shaped catch having limbs extending across the open end of the cage, said limbs being provided with eyes hingedly and slidably connected with said full convolution, the bight portion of said catch being insertable and removable between the half-convolution and adjacent full convolution.

2. In an illuminable artificial bait of the class described, an openwork wire cage adapted to serve as a holder for an insertable and removable illuminable insert and embodying convolutions and substantially closed at one end and completely open at the opposite end, the last named end including a half-convolution and an underlying full convolution, said half-convolution and full convolution providing keeper means, and a U-shaped catch having limbs extending across the open end of the cage, said limbs being provided with eyes hingedly and slidably connected with said full convolution, the bight portion of said catch being insertable and removable between the half-convolution and adjacent full convolution, and one of the limbs on said catch being provided with a line eye.

3. The structure specified in claim 2, together with a rigid stay wire connected at one end with one of the upper convolutions and connected at its opposite end with one of the lower convolutions.

GEORGE SIMPSON SCHWARTZ.

References Cited in the file of this patent

UNITED STATES PATENTS

| Number | Name | Date |
|---|---|---|
| 643,229 | Michael | Feb. 13, 1900 |
| 714,657 | Anderson | Dec. 2, 1902 |
| 1,009,968 | Herrmann | Nov. 28, 1911 |
| 1,338,856 | Cote | May 4, 1920 |
| 1,461,989 | Stockham | July 17, 1923 |
| 1,622,143 | Hope | Mar. 22, 1927 |
| 1,776,090 | Shroyer | Sept. 16, 1930 |
| 2,121,114 | Beck | June 21, 1938 |
| 2,175,754 | Harrison | Oct. 10, 1939 |
| 2,249,691 | Gelardin | July 15, 1941 |
| 2,273,360 | Kidder | Feb. 17, 1942 |
| 2,528,083 | Ruff | Oct. 31, 1950 |